J. T. FANNING.
PRESSURE REGULATING SURGE TANK.
APPLICATION FILED NOV. 22, 1909.

973,183.

Patented Oct. 18, 1910.
2 SHEETS—SHEET 2.

WITNESSES

INVENTOR
JOHN T. FANNING
BY Paul & Paul
ATTORNEYS

UNITED STATES PATENT OFFICE.

JOHN T. FANNING, OF MINNEAPOLIS, MINNESOTA.

PRESSURE-REGULATING SURGE-TANK.

973,183.  Specification of Letters Patent.  Patented Oct. 18, 1910.

Application filed November 22, 1909. Serial No. 529,266.

*To all whom it may concern:*

Be it known that I, JOHN T. FANNING, a citizen of the United States, residing at Minneapolis, county of Hennepin, State of Minnesota, have invented a new and useful Pressure-Regulating Surge-Tank, of which the following is a specification.

The invention relates to a circular waste-weir adapted for combination with a surge tank and with a partially submerged waste pipe.

My invention is especially adapted for use in high-head water powers in which the water for power is led to the turbine water wheels under pressure through a relatively long closed pipe or penstock. In such case, there is a large volume and weight of water in motion and when the turbine is operating at full power the motion of the water is rapid and its momentum great. If the work done by the power of the turbine is intermittent or if the flow of water to the turbine must be suddenly checked for any cause then the momentum and force of the water may burst the penstock or wreck the turbine. Such destruction has usually been prevented by an automatically acting relief valve attached to the penstock near each turbine case or by a standpipe near the turbine and extending so high above the level of the dam, or water supply source, as to receive the volume of water flowing until the artificial head which it produces checks the flow and momentum of the water. Such height of stand-pipe is, in practice, rarely practicable and such increased height of water in the stand or surge pipe increases the pressure of water upon the turbine and the speed of the turbine at the moment when a reduced pressure is desired, and thus seriously interferes with the speed regulation of the turbine.

In most modern uses of water power a constant speed of revolutions of the power shaft is essential.

My invention consists generally in a surge tank or stand-pipe and a waste pipe submerged therein leading therefrom.

Further the invention consists in various constructions and combinations, all as hereinafter described and particularly pointed out in the claims.

Figure 1:
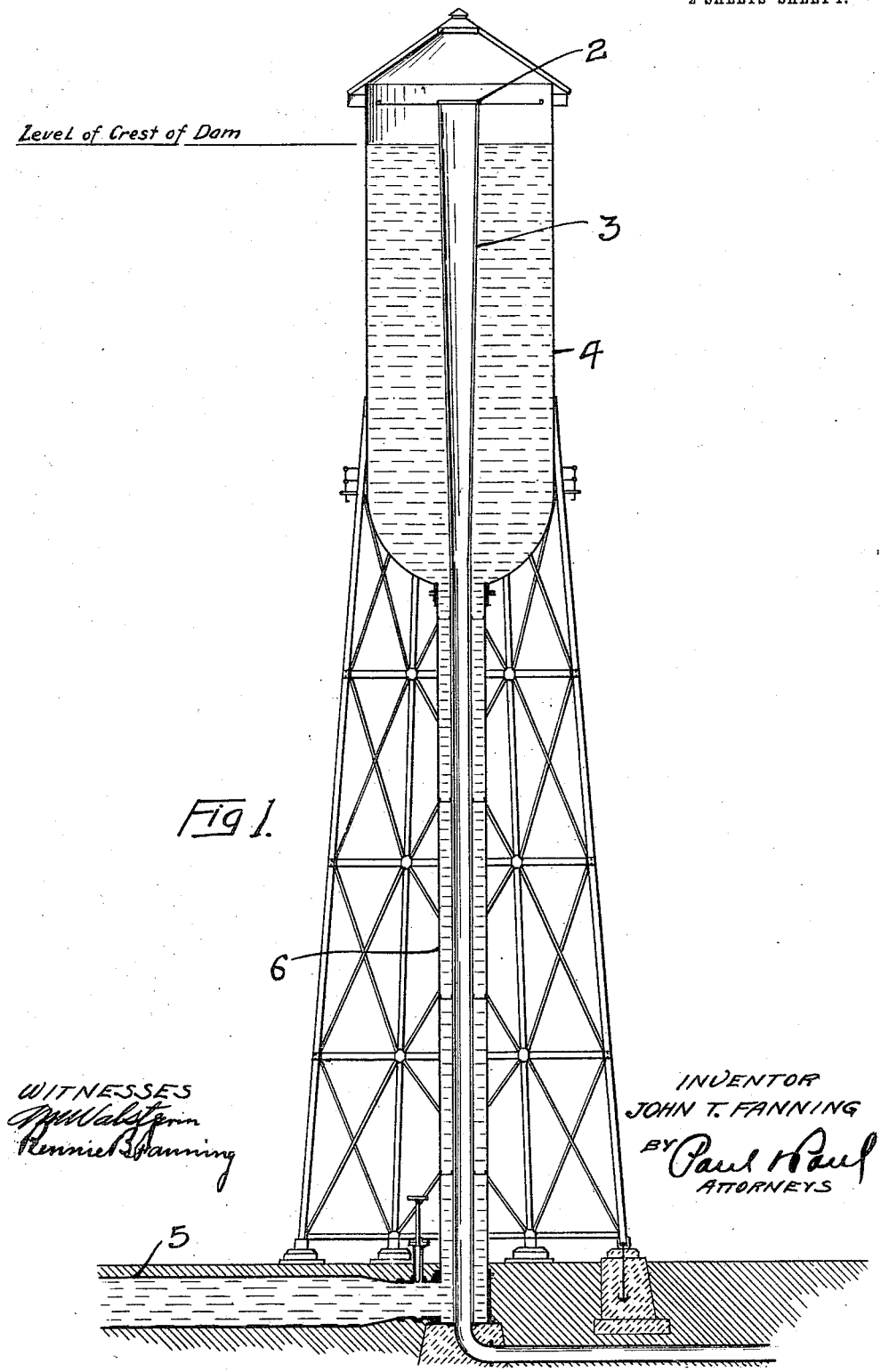
Figure 2:
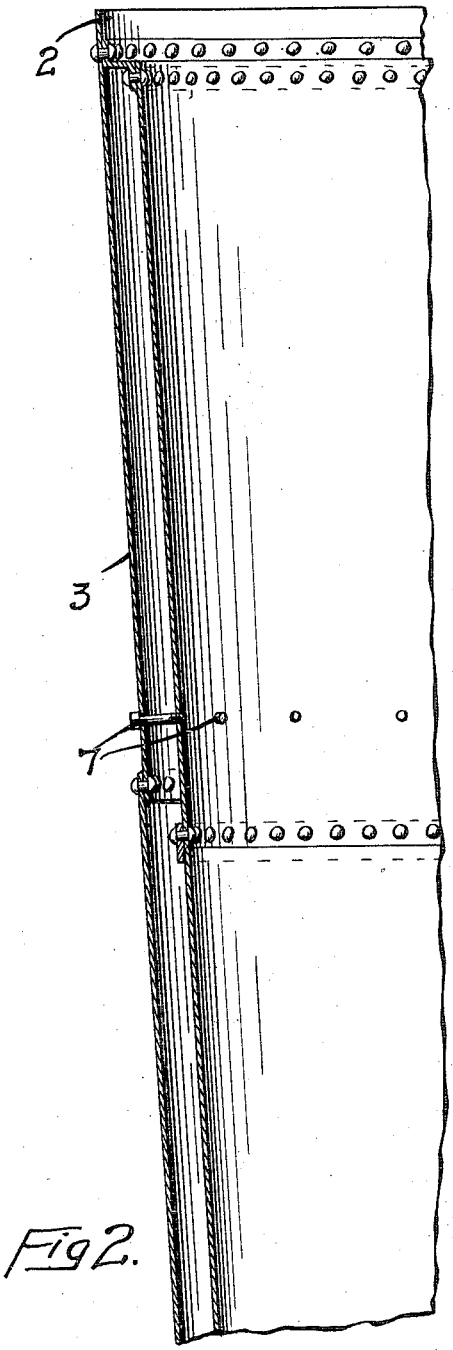
Figure 3:
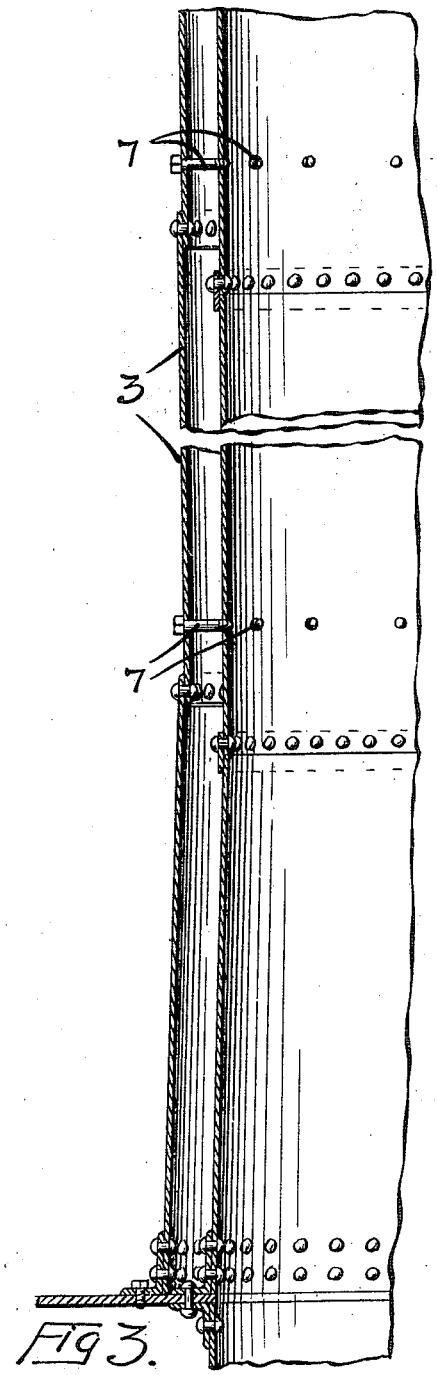

In the accompanying drawings forming part of this specification, Figure 1 is a vertical, sectional view of a surge tank embodying my invention, Figs. 2 and 3 are detail sectional views illustrating the construction of the waste pipe.

In the drawings, 2 represents the waste-weir and 3 the waste pipe, which is located within and in combination with a surge tank 4 or stand-pipe, forming therewith a pressure regulating surge tank. The waste-weir is placed within the tank at a few feet higher than the crest of the dam that deflects water into the penstock connected with the base of the tank, and the tank extends but a few feet above the weir.

A relief tank is almost always a necessity in connection with a long penstock and, if such tank is allowed to overflow, the overflowing water washes the ground about its base in summer and creates a mound of ice in winter and causes an objectionable spray at all times of the year. If a waste pipe is led from the top of the tank down the outside of the tank to the ground, its great weight, with the weight of the waste water, can be sustained only with difficulty and in winter the waste water is exposed to freezing and the waste pipe to clogging with ice so that it may become inoperative and an element of danger to the tank and surrounding buildings. My invention is intended and is used to remedy such defects and annoyances.

The surge tank is advisedly placed on the discharge end or near the end of the penstock 5, supplying water to the turbines. The riser feeder pipe 6, which leads into the surge tank, is made of sufficient diameter so that the waste pipe connected to the weir may pass down through it. The waste pipe is usually placed symmetrically within the tank and riser feeder so that it may be supported on or near the base of the feeder pipe and vibrations prevented by simple stays extending from waste pipe to feeder pipe and tank. The waste pipe and waste water are protected from frost by submergence within the water of the tank and riser pipe, and when the waste pipe issues from the tank or riser pipe through, or near, its base the waste water may be led under ground to its final discharge. In practice, the waste water discharge is found to continue not usually more than one and one-half minutes after each sudden closing of the turbine gates. In practice the waste weir is placed, according to circumstances, at from five to seven feet higher than the level of the crest of the dam. As the surge tank and waste-weir have free water connection from the penstock a water ram in the penstock or turbines is impossible and the water pressure in the turbine case cannot be increased more than is due to the rise of the water in the tank up to the overflow level of the waste-weir. The turbine is not, therefore, unduly speeded by increase of water pressure as the turbine gate is closing.

The waste pipe 3 is enlarged at the top until its circular weir top 2 has sufficient length to discharge with a predetermined depth upon its crest, the advancing water as it comes. The waste pipe 3 reduces in section in a part of its length as it descends, proportionally as the section of the waste pipe water column reduces with its increase of velocity.

In a very high tank in which the waste pipe 3 is subjected to great collapsing pressure, the pipe is usually made with double concentric plate walls, (see Figs. 2 and 3,) said walls being held in true relative position by stud bolts 7.

As soon as the turbine gate is suddenly closed the rise of water in the tank up to the overflow level of the weir produces a counter head on the advancing water in the penstock that soon checks the flow of the water and gradually absorbs its momentum without shock, and usually in from one to one and one-half minutes time.

When the turbine is running without load the water in the penstock is moving very slowly. If then the load is suddenly thrown on, the turbine governor suddenly opens the turbine gates and a full flow of water is called for and if water is not suddenly supplied in abundance there is a sudden reduction of water pressure at the discharge end of the penstock and reduced pressure continues until the inertia of the water in the penstock is overcome and a full flow is attained. This last may be attained in from one and one-half to two minutes but, in the meantime, the speed of the turbine may have been seriously reduced.

In practice it is usual to make the surge tank of sufficient diameter so that its upper twenty or more feet will serve as a reservoir to supply power water to the turbines and maintain approximately their speeds during the brief interval while the inertia of the water in the penstock is being overcome and the water accelerated to full speed.

My waste-weir and attached waste pipe, when combined with an ample sized water tank, constructed and connected substantially as herein described, makes therefore a new and useful pressure regulating surge tank and an adequate protector of a penstock from water rams and from undue water pressures and constitutes a valuable aid in the speed regulation of turbines in high-head water powers.

I claim as my invention:

1. A surge tank and a waste-weir therein, in combination with a waste pipe submerged in said tank and leading therefrom.

2. A surge tank, a circular waste-weir, and a waste pipe attached to said waste-weir and leading therefrom.

3. A surge tank and waste-weir therein, a double-walled waste-pipe within said tank and communicating with said waste-weir, substantially as described.

4. A waste overflow weir having a double-walled submerged waste-pipe in combination with a surge tank, as and for the purpose described.

5. A waste overflow weir in combination with a regulating surge tank within which it is placed and in combination with a submerged waste-pipe adapted to conduct waste water out of the tank through the lower portion thereof.

6. A surge tank having a feed pipe and waste weir within said tank, and a waste-pipe leading from said waste-weir and extending downwardly within said feed pipe and spaced from the walls thereof.

7. A surge tank having a feed pipe, and a penstock communicating therewith, a waste-weir within said tank, a waste-pipe communicating with said waste-weir and extending downwardly in said tank, and said waste-pipe tapering from its upper toward its lower portion.

8. A surge tank having a vertical feed pipe, a waste-weir within said tank, a vertical waste-pipe communicating with said waste-weir and extending downwardly through said feed pipe and spaced from the walls thereof, and said waste pipe being tapered from its upper end toward its middle portion.

9. A surge tank having a feed pipe, a waste-pipe extending vertically within said feed pipe and said tank, and spaced from the walls of said feed pipe, said waste-pipe having double concentric walls, for the purpose specified.

10. A surge tank having a feed pipe and a penstock connected therewith, a waste-pipe extending vertically within said feed pipe and spaced from the walls thereof, the lower end of said waste-pipe having a discharge opening and the upper portion of said waste-pipe being flared, substantially as described.

In witness whereof, I have hereunto set my hand this eighteenth day of November, 1909.

JOHN T. FANNING.

Witnesses:
RENNIE B. FANNING,
RICHARD PAUL.